Patented Jan. 8, 1952

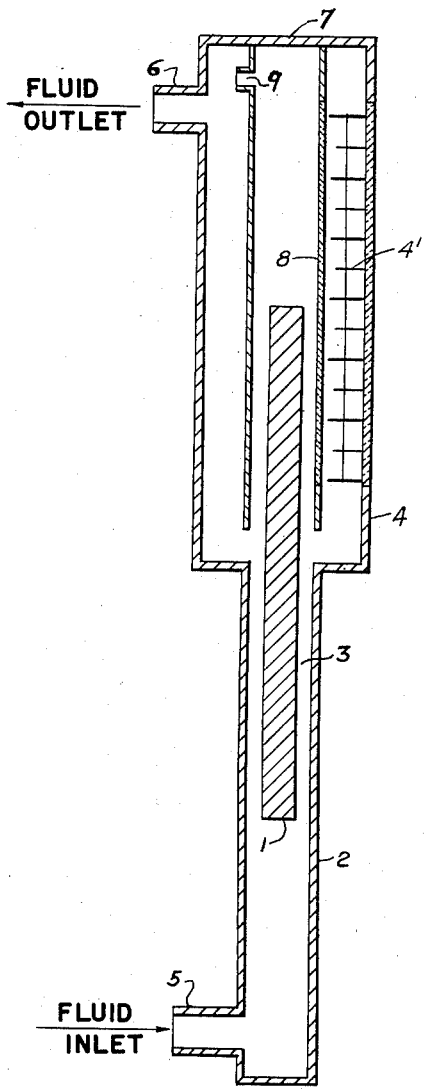

2,581,588

UNITED STATES PATENT OFFICE 2,581,588

FLUID FLOWMETER

David H. Greene, Los Angeles, Calif., assignor to Danciger Oil & Refining Company, Fort Worth, Tex., a corporation of Texas Application December 2, 1946, Serial No. 713,596

2 Claims. (Cl. 73—207)

This invention relates to fluid flowmeter and more particularly to mechanism for indicating or measuring the rate of flow of fluids including gases, liquids and finely divided solids.

In the past, a number of specifically different flowmeters have been suggested and used. Generally considered, such flowmeters have been rather complicated and expensive particularly if a high degree of accuracy over reasonably prolonged periods is achieved. Many of the flowmeters heretofore employed are of the orifice-differential pressure type. One class of this type operates on the principle of utilizing a constant area orifice in which the rate of flow of fluid is a function of and indicated by the pressure drop across the orifice. Another class under this general type operates on the principle of maintaining a constant pressure drop across the orifice and indicating the rate of flow by the area of the orifice. In each device the length of the orifice remains constant.

It has now been ascertained that an extremely simple and efficient flowmeter may be devised by invoking a principle of operation differing from those utilized heretofore. The improved flowmeter to be described, while generally classifiable as an orifice-differential pressure type, is based on the principle of maintaining the area of the orifice constant and the pressure across the orifice constant and indicating, measuring or recording the variation in flow by variation in the length of the orifice. As will be appreciated, this enables the construction of an extremely simple device since it utilizes an orifice and plug of simple cylindrical cross-section and immediately translates simple linear movement of a hydrodynamically displaceable plug into accurate measurement of the rate of flow. The new device is thus not only simple and hence inexpensive to construct but is characterized by a particularly high degree of accuracy which is maintained in service over prolonged periods of time.

Broadly considered, the invention consists of a rod of predetermined weight inserted in a tube through which the fluid to be measured is flowing and operates in accordance with the principle that an object subjected to two or more forces will take up a position that is the resultant of these forces. In the case of immediate moment to measuring the rate of flow of fluids, the forces are gravity and the hydrodynamic force of the fluid flowing against gravity. Gravity being constant at any particular geographical point, the equilibrium position of the rod of a given weight and treatment will be a function only of the rate of flow of any particular fluid. It is presupposed that construction material is chosen that will not be acted upon by the flowing fluid.

In order to enable a more ready comprehension of the principles of the invention a simplified physical embodiment is shown diagrammatically in the accompanying drawing.

As shown in the drawing, an elongated member 1, preferably of cylindrical cross-section, is inserted in the vertically disposed tube 2. The diameter of the member 1 and the internal diameter of the tube 2 are chosen so as to establish a predetermined distance therebetween. This establishes an annular area 3 between the tube 2 and the plug or rod 1. It might be explained that this annulus acts as an orifice which in the operation of the device varies in length in response to a change in the rate of the fluid flowing through the instrument. The tube 2 is connected in any suitable manner to an axially co-extensive tube or chamber 4 of greater diameter than tube 2. Depending upon the materials of which the tube and chamber are constructed the connection therebetween may be of any type such as a screwthreaded, welded, or cemented joint. As will be seen hereinafter, the tube and chamber may be constructed of carbon steel or alloy steel tubing, glass, transparent plastics and the like.

The lower portion of the tube is provided with an inlet port 5 positioned well below the lowermost operative position of plug 1 and the enlarged chamber 4 is provided with an outlet or discharge port 6 near its upper end. The upper end of chamber 4 may be and preferably is closed by the detachable or integral cover plate 7. In operation, as will be seen, the fluid whose rate of flow is to be measured enters port 5, travels upwardly in the tube 2, passes through the annular channel 3 defined between the tube 2 of the plug 1 and is discharged through outlet 6.

It has been found that best results are obtained when the characteristics of viscous rather than turbulent flow are established. To reduce turbulence and to minimize the effect of the motion of the fluid passing through tube 4 on the operation of plug 1, a concentric tubular member 8 is provided. As shown, this may be attached to and suspended from the cover 7 and is provided with a leak port 9 positioned near its upper end and adjacent to the discharge port 6. This provides a quiescent reservoir of fluid, into which the upper end of the plug projects, and in which there is substantially no flow. This dampens or buffers rotational movement of the plug and insures more complete response of the lower portion of the plug to variations in the rate of flow. The enclosing tube 8 also functions as a mechanical guide for plug 1 insuring proper centering of the plug in the orifice tube 2.

The essential operation of the meter will be apparent from the above described structure. When the fluid medium enters inlet 5 and flows upwardly in the tube 2 the rod or plug 1 rises until a portion of the plug extends into the chamber 4. With any particular fluid at a given rate of flow the plug or rod assumes an equilibrium position. This position, as will be understood, is determined by the force of gravity acting on the rod balanced at the particular equilibrium position by the upward thrust or force of the flowing fluid medium. If this rate of flow increases the rod or plug rises in the tube 2 to assume the new position of equilibrium. This shortens the length of annulus 3. Conversely, if the rate of flow of the entering fluid is decreased the plug assumes a position of equilibrium at a lower level in the tube, thereby lengthening annulus 3. It will thus be seen that any given vertical position of the rod in the tube 2 corresponds immediately and directly to a specific rate of flow of the particular fluid.

The vertical position of the rod 1 obviously can be indicated in a number of ways. For example, an index mark may be placed on the rod 1 and this may be compared with a suitably calibrated scale 4' placed on the tube 4. Observations may be facilitated by providing a sight window in the tubes 4 and 8 to permit visual inspection of the rod 1, in the event the unit is of metal construction. If the tubes 4 and 7 are constructed of transparent material the position of the rod can, of course, immediately be ascertained.

There are a number of factors which affect the sensitivity and range of the meter. Obviously, an annular chamber 3 must be established between the tube 2 and plug 1 to permit flow of fluid and to render the plug responsive to changes in the fluid forces acting thereon. As this annular area or channel is diminished, i. e., as the distance between the plug 1 and the inner wall of tube 2 is diminished, the characteristics of viscous capillary flow is approached and the sensitivity of the instrument is increased; conversely, however, the range of the meter is commensurately decreased. Similarly, as the diameter of the chamber 4 approaches that of the plug or rod 1 the sensitivity of the unit is enhanced. Again, localized enlargements of rod 1, especially if located near the lower and upper ends, increases the sensitivity and correspondingly reduces the range of the meter.

The range of the instrument can be varied by modifying a number of other factors. For example, the range can be increased by modifying the surface of the plug as by providing the rod with a roughened surface. This roughened surface may be random as obtained by sandblasting, etching and the like, or it may be orderly as attained, for example, by turning a thread on a section of or on the whole cylindrical surface of the rod. The range of the unit, for a given diameter of rod 1 and tube 2, may likewise be modified by varying the weight of the rod either by changing the length of the rod or by utilizing materials of different specific gravity or both.

The simplicity and efficiency of the improved instrument can be appreciated more readily from a consideration of the construction and operation of a simple type of unit embodying the principles hereinbefore discussed. A glass tube corresponding to tube 2, 6 inches in length, and having an internal diameter of 0.236 inch, was connected at its upper end to an enlarged glass tube 4 which was 6 inches long and 0.394 inch in diameter. The tubes were provided with the inlet line 5 and the discharge line 6. A brass rod, 5.6 inches in length and 0.187 inch in diameter was inserted in the tube 2. The inlet 5 was connected to a controlled source of water under a slight head and the outlet line 6 was connected with a measuring cylinder to measure the volume of water discharged.

Now, from theoretical considerations it was determined that the relationship existing between the rate of flow of a fluid through the described instrument and the equilibrium position of the rod, as measured from an arbitrary zero point can be expressed with substantial accuracy as follows:

$$V = \frac{K}{(C \pm R)^n}$$

wherein V is the rate of flow, R is the reading and KC and $n$ are constants.

Water was caused to pass through the unit described above, at three different rates of flow, namely, 485, 622 and 907 cc. per min. At these rates the readings on the instrument were 7.25 in., 9.35 in. and 11.25 in., respectively. These readings represented the distance from the bottom of the tube to the equilibrium position attained by plug 1 and measured at the top surface of the plug.

From this actual data it was calculated that the values of K, C and $n$ in the above equation were respectively 1140, 12.85 and 0.5 with a minus sign in the denominator. Hence, for the particular instrument constructed, as described, and using water as the fluid medium the above equation when substituted becomes:

$$V = \frac{1148}{(12.85 - R)^{0.5}}$$

A series of tests of the instrument were made, using water as the fluid medium, and the observed results compared to those calculated from the theoretical equation. The following three observations are typical of such tests:

Table

| R | Rate of flow in cc./min. | |
|---|---|---|
| | Observed | Calculated |
| 7.60 | 500 | 501 |
| 8.50 | 548 | 550 |
| 10.40 | 733 | 733 |

These data strikingly illustrate the remarkable degree of accuracy with which the flow rates can be measured by means of this eminently simple instrument. This accuracy was maintained over a prolonged period of several months of constant use of the unit Similar tests were made to determine the rate of flow of a number of fluids other than water to establish the wide utility of the instrument. For example, a flowmeter of the type herein described, except that the rod 1 and tube 2 were constructed of carbon steel, was used for prolonged periods to measure the rate of flow of gases such as natural gas and acetylene. In these uses the same striking high degree of accuracy of the instrument was maintained.

As has been previously pointed out, flowmeters of the type described herein may be constructed of readily available and inexpensive materials. The materials chosen for the construction are limited only to and should be correlated with the characteristics of the fluid medium which is to be measured, that is to say such materials should be resistant to any corrosive or other chemical action of the fluid. Where highly corrosive liquids such as acids, or gases such as acidic gases are to be measured, corrosion resistant alloy steels such as 18-8 stainless steels are indicated. Where non-reactive or substantially neutral fluids are to be measured other and less expensive materials of construction may be utilized. Thus, depending upon the particular fluid to be measured, the wide permissive range of materials includes non-ferrous alloys, carbon steels, high or low alloys steels, glass and, for low temperature operations, suitable plastics preferably of the transparent type such as cellulose acetate, methacrylate, urea and phenolic resins. The rod or plug may be constructed of any solid material that is substantially inert to the fluid to be measured. While the plug is shown as a solid tubular member it will be understood that it may be in the form of a tube with the ends either opened or closed and may, for example, comprise a hollow tube weighted with some other material. This range of materials of construction coupled with the potential variations in range as well as in sensitivity which have been previously described thus inherently adapts the unit to an extremely wide use in the technological fields.

Hence, while preferred embodiments of the invention have been described it is to be understood that these are given to exemplify the underlying principles involved and not as limiting the useful scope or application of the improvement to the illustrative structure or uses.

For instance, while it is preferable that rod 1 and tubes 2, 4 and 8 be cylindrical, the device will operate if any one or more of these members have other than a circular cross section. A squared cross section, for example is equally applicable.

I claim:

1. A flowmeter comprising, a vertically disposed tubular member of uniform diameter and predetermined length, a second tubular member of greater diameter secured coaxially to the upper end of the said first tubular member, a fluid inlet line connected with the lower portion of the first tubular member, a fluid outlet line connected with the upper section of the said second tubular member, an elongated rod of predetermined weight fitting within and being closely spaced from the internal walls of the said first tubular member, said rod being adapted to move vertically within the tubular members upon variations in the rate of flow of the fluid medium, a third tubular member of substantially the same diameter as the first tubular member secured to the upper portion of said second tubular member and being coaxial with the second tubular member and into which the said rod is adapted to project, the lower end of the third tubular member being spaced from the said first tubular member to establish a free fluid passage therebetween, the second tubular member and the third tubular member being provided with adjacent transparent sections extending vertically within the normal range of movement of the rod to optically indicate the position assumed by the rod.

2. A flowmeter comprising, a vertically disposed tubular member of uniform diameter and predetermined length, a second transparent tubular member of greater diameter secured coaxially to the upper end of the said first tubular member, a fluid inlet line connected with the lower portion of the first tubular member, a fluid outlet line connected with the upper section of the said second tubular member, an elongated rod of predetermined weight fitting within and being closely spaced from the internal walls of the said first tubular member, said rod being adapted to move vertically within the tubular members upon variations in the rate of flow of the fluid medium, a transparent third tubular member of substantially the same diameter as the first tubular member secured to the upper portion of the second tubular member and being coaxial with the second tubular member and into which the said rod is adapted to project, the lower end of said tubular member being spaced from the first tubular member to establish a free fluid passage therebetween, the said transparent second tubular member and transparent third tubular member visually indicating the position assumed by the rod.

DAVID H. GREENE.

REFERENCES CITED

The following references are of record in the file of this patent:

UNITED STATES PATENTS

| Number | Name | Date |
| --- | --- | --- |
| 2,020,588 | Stuart | Nov. 12, 1935 |
| 2,262,807 | Larner | Nov. 18, 1941 |